(12) United States Patent
Murad et al.

(10) Patent No.: US 6,920,256 B2
(45) Date of Patent: Jul. 19, 2005

(54) FIBER OPTIC OCCUPANT OR OBJECT CLASSIFICATION SYSTEM

(75) Inventors: Mohannad F. Murad, Troy, MI (US); Peter C. Kempf, Dexter, MI (US); Almasri Hossam, Sterling Heights, MI (US); Randal Gosk, Clinton Township, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 100 days.

(21) Appl. No.: 10/457,189

(22) Filed: Jun. 9, 2003

(65) Prior Publication Data

US 2004/0247228 A1 Dec. 9, 2004

(51) Int. Cl.$^7$ ................................................. G02B 6/26
(52) U.S. Cl. ........................ 385/12; 385/13; 250/227.16
(58) Field of Search ... 385/12, 13; 250/227.14–227.16; 180/271–273, 287; 280/728.1, 734, 735; 297/217.1, 217.2

(56) References Cited

U.S. PATENT DOCUMENTS

| 4,603,252 | A | * | 7/1986 | Malek et al. | ........... 250/227.14 |
|---|---|---|---|---|---|
| 4,781,056 | A | * | 11/1988 | Noel et al. | ..................... 73/800 |
| 6,030,347 | A | * | 2/2000 | Nakamura et al. | ........... 600/552 |
| 6,040,532 | A | * | 3/2000 | Munch | ........................ 177/144 |
| 6,353,394 | B1 | * | 3/2002 | Maeda et al. | ................ 340/667 |

* cited by examiner

Primary Examiner—Rodney Bovernick
Assistant Examiner—Mike Stahl
(74) Attorney, Agent, or Firm—Markell Seitzman

(57) ABSTRACT

An occupant classification system comprising: a seat upon which an occupant may sit or on which an object may be placed, the seat having one of a seat cushion and a seat back; at least one optical fiber having a measurable optical characteristic, arranged in a specific pattern, the optical characteristics of the fiber changeable when a force is applied to the fiber; and a processor responsive to an output signal from each fiber for generating a control signal determinative of a physical characteristic of an object or occupant on the seat.

7 Claims, 5 Drawing Sheets

FIBER OPTIC OCCUPANT OR OBJECT CLASSIFICATION SYSTEM

BACKGROUND AND SUMMARY OF THE INVENTION

The present invention relates to a safety restraint system which includes an object or occupant classification system and more particularly to a device using fiber optics arranged in a specific pattern in a seat of a vehicle.

It is an object of the present invention to provide an occupant or object classification system and additionally one such system which can also be used to provide weight and/or position information about particular objects and/or an occupant occupying a vehicle seat. The present invention utilizes one or more fiber optic cables (which are also referred to as fibers, cables, optic fibers, optical fibers, etc.).

Fiber optic cables have been used in many applications. The typical construction of a fiber optic cable is well known and includes a light carrying center core. The center core is covered by a cladding, which acts as a mirror to reflect incident light and to keep the light within the core. The optical characteristics and more particularly the refractive indexes of the cladding and of the core will vary with application. The optical characteristics of the cable determine the transmissibility of light through the cable. A cable with a higher transmissibility provides a more efficient cable, which transmits light more effectively while a less efficient cable transmits light with greater losses. The signal measured at the output end of an optical fiber may vary relative to a signal at its input end in amplitude and/or in phase shift, etc.

In the present invention the optical characteristics of the fiber (or at least a portion thereof) change when the fiber is displaced, stressed and/or bent thereby causing a measurable change in its output.

A receiver or detector is connected to the output end of each fiber and is used to measure the output (amplitude, phase, polarization angle, etc.) of the optical fiber. This change in output is proportional to the transmissibility of the cable, which varies with displacement, stress or degree of bending of the optic fiber cable, which in turn is correlatable with the force applied to the cable. In the present invention optical cable(s) are mounted in the seat cushion or seat back of an automotive seat. As can be appreciated, a measure of the distribution of forces in the seat cushion and/or seat belt can be used to classify the object or occupant into one or more classes, as well as to identify the position of the object and/or occupant on the seat.

Accordingly the invention comprises: an object classification system comprising: a cable or plurality of such cables arranged in one or more specific patterns within a seat cushion and/or seat back, the optical characteristics of the fiber being changeable with applied force to the fiber(s). The system includes a processor responsive to the output signal from each or selective fibers for generating control signals determinative of the force(s) acting on the cables.

Many other objects and purposes of the invention will be clear from the following detailed description of the drawings.

DETAILED DESCRIPTION OF THE DRAWINGS

Reference is briefly made to FIGS. 1A–1D, which diagrammatically show different multi-dimensional force patterns produced on or in a seat cushion of a typical automotive seat when: a) a child seat has been secured to the seat, b) a $5^{th}$ percentile female is seated in a normal seating position, c) a $95^{th}$ percentile male is seated in a nominal seated position on the seat cushion of a typical vehicle seat and d) an occupant seated in an out-of-position (OOP) seated position that is seated toward one side of the seat and toward the front of the seat. As can be appreciated, when the occupant (or object) presses on the seat back, a corresponding force distribution pattern is also generated upon the seat back. By sensing these forces or patterns the object and/or occupant on the seat can be identified.

Figure 1A:
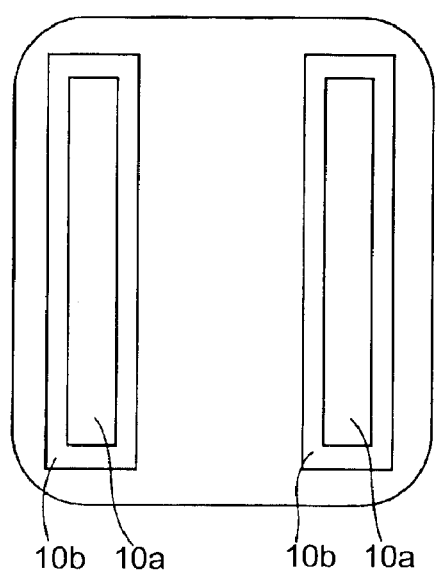
FIGS. 1A–1D show various force distribution patterns created by different objects and occupant on a seat cushion.
Figure 1B:
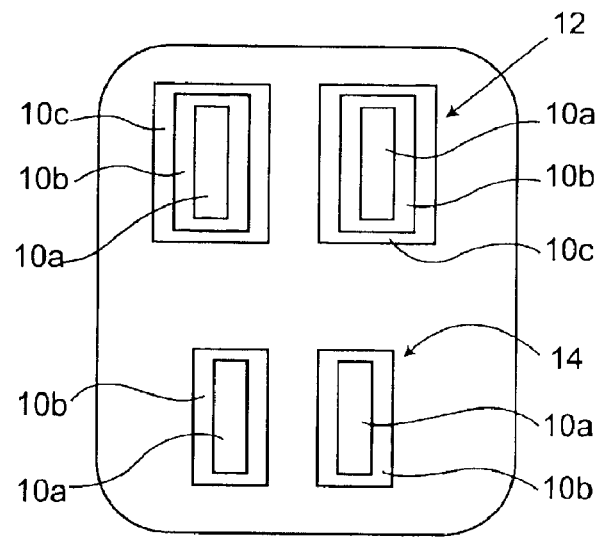
Figure 1C:
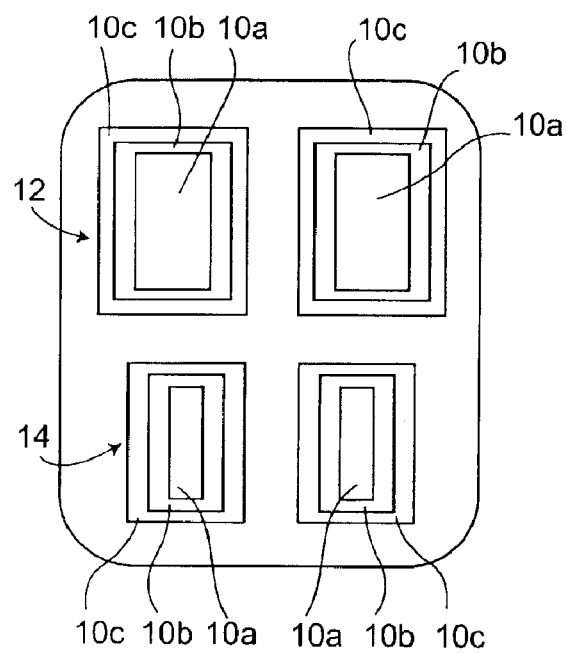
Figure 1D:
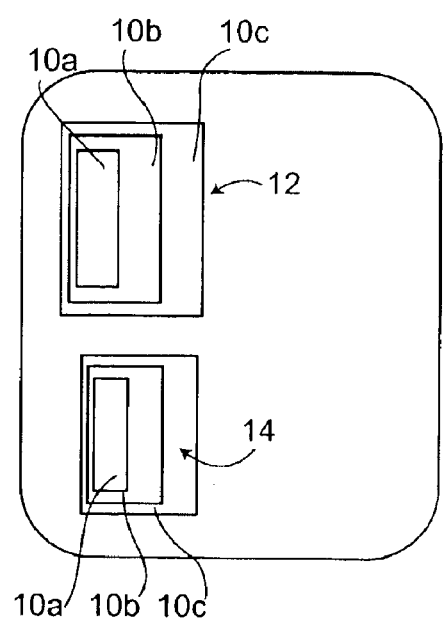

With regard to the child seat weight or force distribution of FIG. 1A the support legs (not shown) of the child seat create a narrow profile with a more intense force level 10a at the center surrounded by a less intense force region 10b. The weight or force distribution produced by a $5^{th}$ percentile occupant will resemble the profile shown in FIG. 1B, which diagrammatically shows the forces produced by the buttocks 12 and under-thigh region 14 of this smaller occupant. The intensity of the forces on the seat will vary from a relatively high region 10a to a mid-level region 10b to a lower intensity region 10c. A similar force distribution will be created by the under thighs area of the occupant at or near the front of the seat. The intensity of the forces will vary with the weight of the individual occupant. FIG. 1C shows a force distribution pattern that is similar to that of FIG. 1B but is larger in size and intensity to represent the distribution of force (weight) produced by, for example, a properly seated $95^{th}$ percentile male occupant. FIG. 1D shows an asymmetrical weight distribution (an out-of-position distribution) created when an occupant has shifted his or her weight to the side of the seat.

The prior art uses one or more pressure or strain sensors placed under the seat cushion of a vehicle seat to measure the weight of the occupant or the location of the occupant on the seat.

Figure 2:
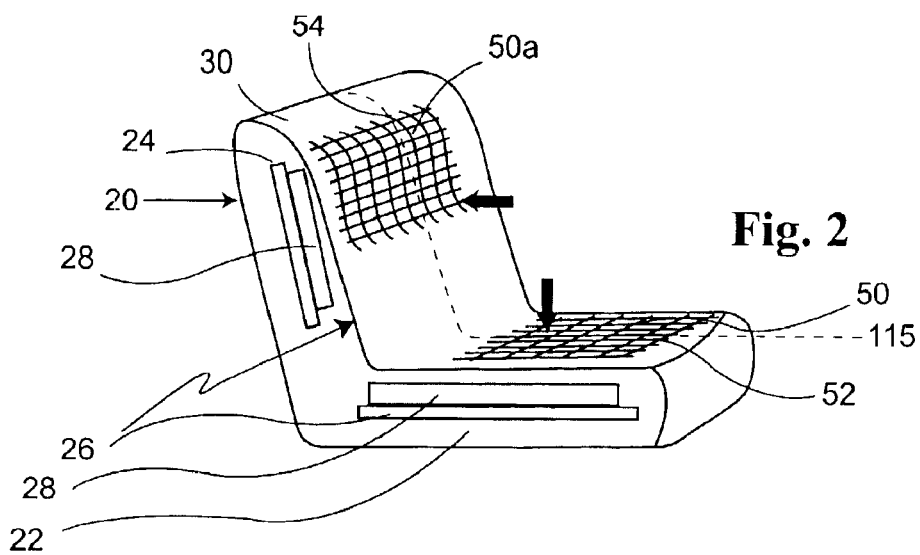
FIG. 2 illustrates a rudimentary system incorporating the present invention.
Figure 2A:
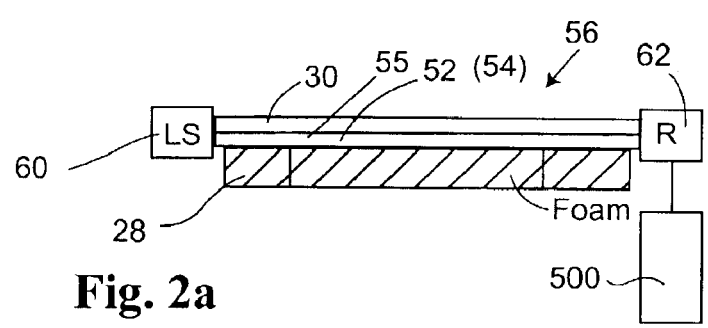
FIG. 2A illustrates further details of a fiber optic system.

Reference is briefly made to FIGS. 2 and 2A, which illustrate a typical vehicle seat 20 comprising a seat cushion 22 and seat back 24. The seat 20 includes a frame 26 (located to support the cushion and the seat back), typically covered by a foam or other resilient material 28. The resilient material 28 is itself covered by an upholstery or covering material 30, such as cloth, leather, plastic, metal or other similar material. Positioned in between the resilient material 28 and the upholstery material 30 is a matrix of optical fibers, generally shown as 50 and 50a (integrated on a mat or carrier), one for the seat cushion 22 and another that can optionally be placed in the seat back 24. In a limiting context, an occupant protection system 56 can be formed of a single optical fiber such as 52 positioned in the cushion. Another single optical fiber 54 can also be positioned in the seat back. In this rudimentary system, as well as in a more complex system, when an object or occupant sits upon the seat, that is loads the seat cushion or the seat back, the fiber optic cable or cables 52 or 54 will be deformed, changing the level of output signal of the fiber. This change, caused by a change in the physical characteristics of the optical fiber, will be sensed by an optical sensor, detector and/or receiver (shown in FIG. 2A).

The fiber optic system 56 as shown in FIG. 2A, comprises a single fiber optic cable 52 (54). A similar construction is used for each fiber of a more complex system. A light source 60 is connected at one end of the cable (an input end) and a receiver or detector or other appropriate sensor 62 is connected at another end of the cable (the output end). As mentioned above, the cable 52 (or 54) is preferably situated under the upholstery material 30 of the seat and above the foam or resilient material 28. As required, the cable may be mounted to a semi-flexible mat or pallet 55, which may enhance the ability of certain optic fiber to be bent. In one embodiment of the invention the mat or pallet 55 can be made from Mylar or other plastic. If the system 56 comprises a matrix of such optical fibers (shown in FIG. 2), these fibers, as mentioned above, will also be placed as indicated in FIG. 2A between the resilient material and the covering material of the seat cushion or seat back. As can be appreciated, it is also within the scope of the present invention that the fiber(s) be placed below the resilient seat material 28 such as upon a seat pan or wire/spring support or secured directly to the upholstery material.

The output of the receiver is communicated to a controller, which processes this signal and generates a signal or signals indicative of the fact the seat 20 may be occupied by an object or occupant of a known weight classification. As required certain intervention may be required with other systems or sub-systems of the vehicle. For example, the occupant protection system may include an air bag and inflator and an intervention signal or activity may deactivate the inflator or cause the inflator to operate at one or many possible discrete operating levels so the occupant is properly protected.

Reference is again made to FIG. 2A, and in particular to the single optical fiber system 56, which may be located at an arbitrary, though predetermined, orientation in the seat. As can be appreciated, if the cushion or seat back is deflected in an area not coincident with the location of a single optical fiber, the fiber may not be bent at all or not bent sufficiently and consequently the output signal of such a fiber may not change as required.

Figure 3:
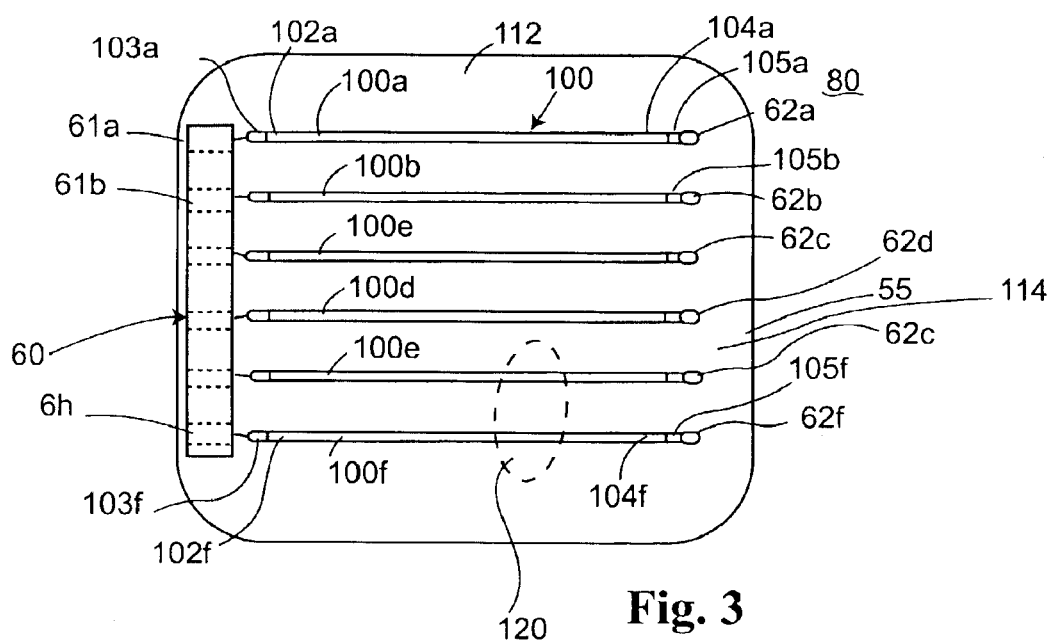
FIG. 3 shows an alternate embodiment of the present invention.

FIG. 3 illustrates an occupant protection system 80 comprising a first set 100 of n optical fibers. As illustrated, system 80 includes six (n=6) optical fibers 100a–100f arranged parallel to one another. These cables would be oriented in the seat in a manner shown in FIGS. 2 and 2A. A respective input end 102a–f of each cable 100a–f is connected to a light transmitter (source) 60 through a known type of optical termination (connector) 103a–f, shown schematically. The transmitter 60 can be an LED or incandescent bulb. A discrete light source can be associated with each input end of each cable; however, in this embodiment a single light source provides an economical solution. The discrete light sources are shown (in phantom line) for the purpose of illustration by numerals 61a–f and are schematically integrated within the signal light source. Each cable or fiber 100a–100f includes a respective output end 104a–f connected to a receiver (detector, sensor) 62a–f through another optical termination (connector) 105a–f. As can be seen, each output end 104a–f is communicated to a separate optical receiver 62a–f. A simple optical receiver can be a photodiode. As also mentioned above, to maintain the orientation of and protect the optical fibers 100a–100f they would also be secured to the flexible mat 55.

The fibers 100a–f of this first set 100 can be oriented relative to the seat in many ways. For example, assume side 112 of the mat 55 is oriented toward the front of the seat (in this example the individual fibers 100a–100f would run from side-to-side across the seat). If, for example, the occupant sits or if an object is placed toward the forward part or front edge of the seat (toward side 112 of the mat), the optical cables 100a–100c in a region of increased force will deflect (more than the cables closer to the rear of the seat) and cause a change in the light transmission characteristics of the affected fiber(s) which will be seen as a change in output signal of one or more fibers. In this example, fibers 100d–f would not deflect at all or at least not deflect as much as fibers 100a–c. However; if the object or occupant is in the middle of the seat, that is, at the normally seated position in the seat, the weight will be distributed more uniformly across the entire seat surface and all fibers 100a–100f may deflect (to some degree), with relatively more deflection experienced by fibers 100d–100f, that is, those fibers (cables) toward the rear of the seat. If the object or occupant is placed or located more to the rear of the seat, then other cables, for example cables such as 110d–100f may also show a corresponding change in their output signal. The number of cables affected and the relative change in the output signal can be used to establish an array of output signals that can be correlated with or empirically determined force distribution patterns such as shown in FIGS. 1A–1D (created by a known object or occupant) which may be stored within a microprocessor, memory or controller of the system 80. By monitoring the level of the output signal of each fiber, the system can determine the level of force applied to the cable and thus distribution of the force(s).

The set 100 of fibers can be oriented in other ways relative to the seat cushion or seat back. For example, side 114 of the mat 55 can be pointed toward the front of the seat (or to the top or bottom, or either side of the seat back). This array of fibers (which are generally parallel to the sides of the seat) would be more responsive to seat loads created if the occupant or object were positioned off from the center of the seat. For example, if the object or occupant were placed or seated to the right or to the left side of the centerline 115 (shown in phantom line) of the seat 20 (cushion or seat back) (see FIG. 2), the optical fibers 100a–f, which are loaded, will be deflected, causing a change in the output of certain of these optical fibers. This type of optic fiber orientation would be helpful if the purpose of the system is to identify laterally out-of-position occupants. As used herein an out-of-position occupant is one who is not properly seated in the seat.

Figure 4:
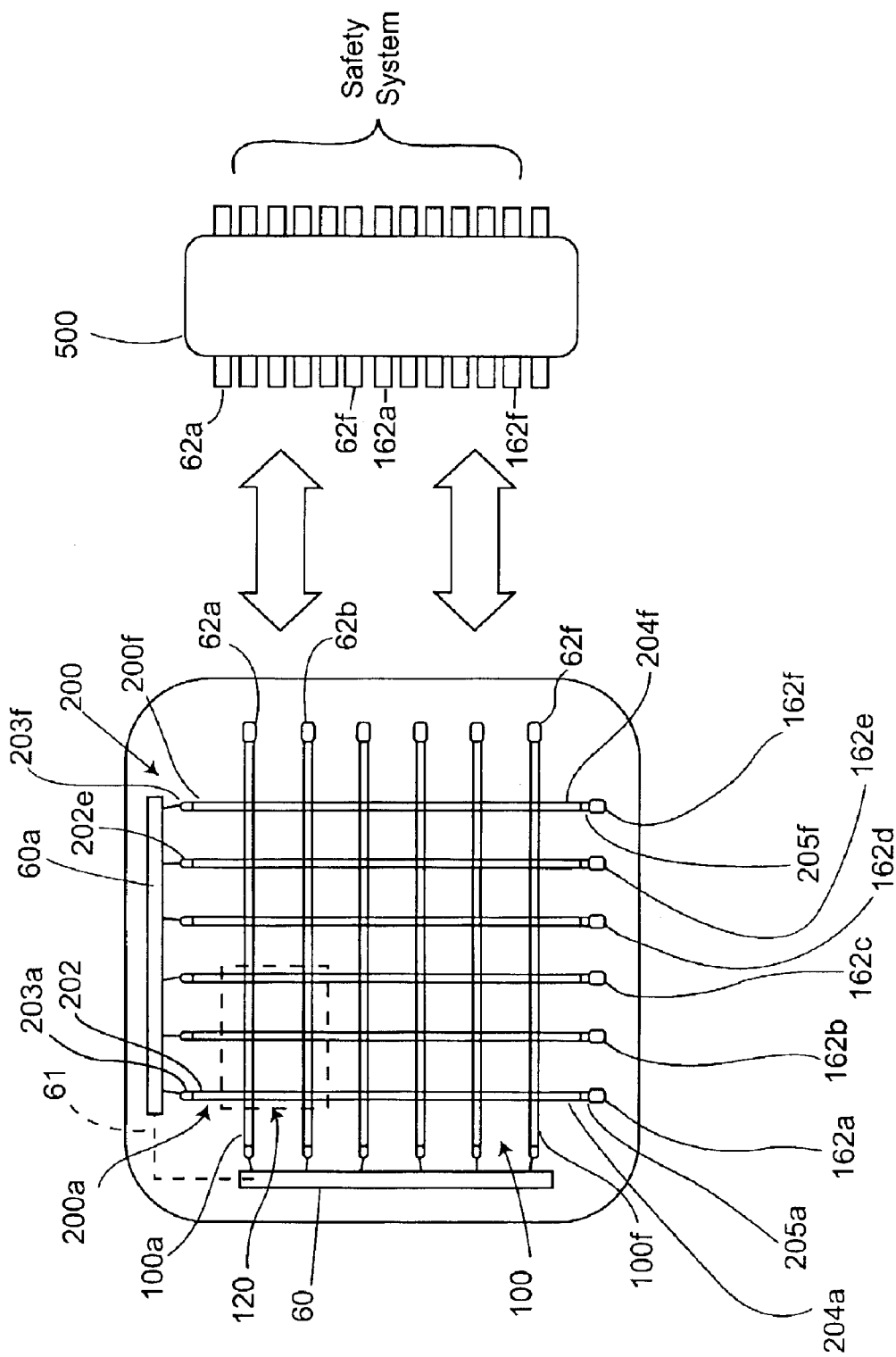
FIG. 4 represents a further embodiment of the invention.

Another way of identifying out-of-position occupants could be to separate or in combination monitor the deflection of fibers in the seat back. If the fibers in the seat back are not deflected, it means that the occupant is not normally seated (in this case a normally seated occupant is presumed to be supported by the seat back. Reference is made to FIG. 4, which shows another embodiment of the present invention. As can be seen in FIG. 4, the transmitter 60 (or set of discrete transmitters), first set of cables 100, and receivers 62a–f form a part of this alternate embodiment. Superimposed upon the mat 55 and on the first set 100 of fiber optics 100a–100f (in general a set of m fibers) is another set 200 of m fibers. In the present embodiment the number of fibers in the first and second sets is the same (n=m), however, n need not equal m. The second set of fibers 200 is arranged at a predetermined angle to the first set of fibers. In the preferred embodiment this predetermined angle is 90 degrees, however, other orientations are within the scope of the invention. In the illustrated embodiment six fiber cables 200a–200f are used. Each of these cables 200a–200f includes a respective input end 202a–f and a respective output end 204a–f. Each input end 202a–f is connected to a light source(s) 60a via a respective optical termination (connector) 203a–f (also shown schematically). The output ends 204a–f of cables 200a–f are connected to respective receivers (detector, sensor) 162a–f through an optical termination (connector) 205a–f. As with the earlier embodiment the light source 60a can be a single light source or a plurality of discrete light sources associated with one or more fibers 200a–f. The phantom line 61 in FIG. 4 schematically connects the light sources 60 and 60a together to illustrate that one light source can be used for all of the fibers 100a–f and 200a–f.

Reference is briefly made to the rectangularly shaped object (in general an object or occupant) 120 shown in phantom line in the matrix of optical fibers of FIG. 4. As can be appreciated, if an object such as 120 is placed upon the sets of fibers 100 and 200 and this object is of sufficient weight to deform the fibers, then the optical output of certain sets of the fiber cables such as 100a and 100b and 200a–200c will be changed. This change in the optical output is sensed by the appropriate receivers 62a, b and 162a–c, which generate a corresponding signal. Each of the receivers 62a–f and 162a–f is communicated to a microcontroller 500, which may include a signal conditioner (or each fiber can include a separate signal conditioner), a memory and storage module.

The intensity of the output signal of each fiber will vary from a maximum when the fiber is unperturbed to a minimum when the fiber is deformed to an extreme. The fact that the output of a fiber has changed provides, inter alia, information as to the location of the applied force within the matrix of fibers (the output signal also carries information regarding the location of forces applied as described below). In FIG. 4, the various sets of fibers are arranged into an x-y coordinate system with the location of each fiber at a known location. For example, in a simple system the plurality of output signals received by the microprocessor 500 can be used to determine only the position of the object or occupant on the seat as opposed to also trying to identify or classify the type of object/occupant. Knowledge of the exact change in the output level, in this scenario, is of modest importance. Changes in an output signal about a predetermined level are used by the microprocessor 500 to determine a zone of activation on the seat, that is the location of the object (occupant) on the seat.

The change in the output signal level of a fiber will be proportional to the applied force. Consequently, in a more complex system, keeping track of which fibers are deformed and the change in the magnitude of output signal of these fibers enables the formation of an output signal pattern, which can be correlated with a force distribution pattern or matrix (created by a known object or occupant acting on the seat cushion or seat back as the case may be). The location of the fibers provides x-y (or even polar) coordinate position information in relation to the physical dimensions of the seat and the change in output signal provides a z-axis coordinate (magnitude) for the output signal pattern. Each known force distribution pattern such as the patterns in FIGS. 1A–1D, stored in the microprocessor 500, is associated with an object of interest ($5^{th}$, $50^{th}$ and $95^{th}$ percentile occupant seated forward or rearward or to one side or the other on the seat, a child seat, package of groceries, etc.) and is compared in the microprocessor 500 with the measured force patterns.

The change in the level of output signal of the above-identified fibers identifies a pattern that is correlatable with the object 120 location as well as the size and weight of the object. In the preferred embodiment, the output of each fiber will change in an analog manner and a measure of the output signal of each fiber is proportional to the bending of the fiber, which is proportional to the force applied to the seat in the general area above the deflected fiber.

With regard to the systems of FIGS. 3 and 4, it can be appreciated the resolution of each system improves with increasing numbers of optical fibers. It should be appreciated the cost of a system (using many more optical fibers) increases dramatically as more optical termination (connectors) and receivers are required.

Figure 5:
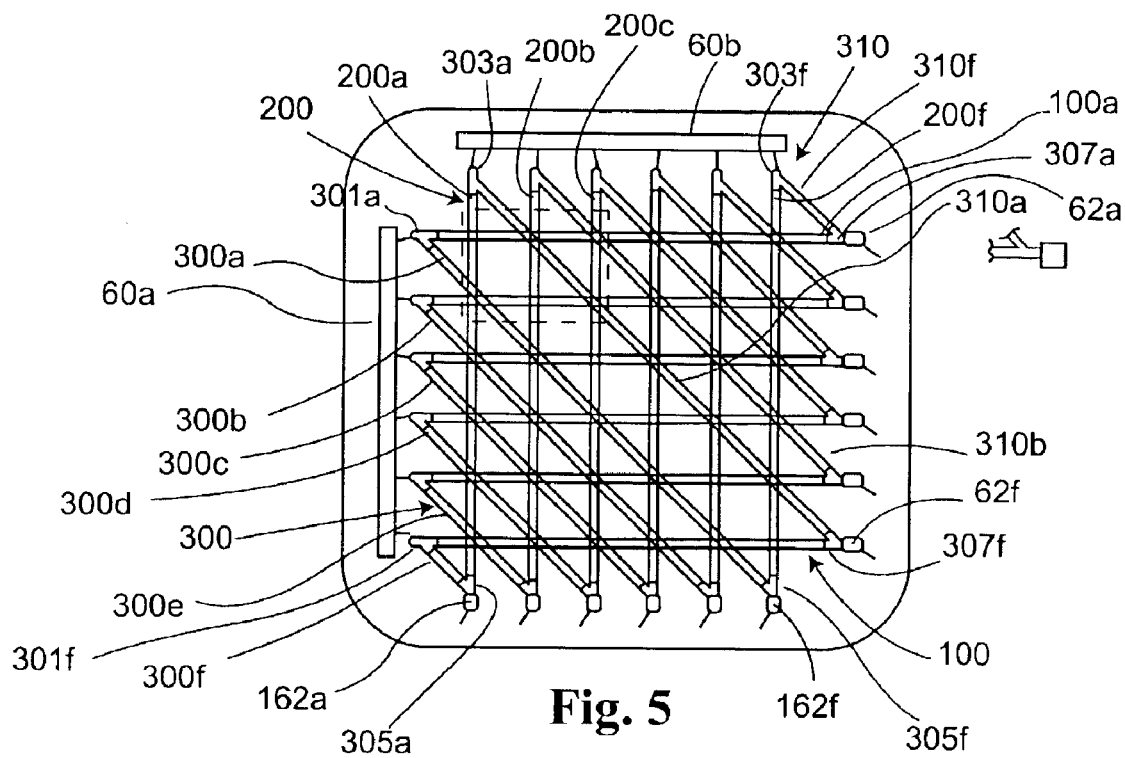
FIG. 5 shows a further embodiment of the present invention.

Reference is made to FIG. 5, which illustrates a more complete occupant classification system having an improved level of resolution but one that uses the same number of optical transmitters and receivers as used in the system shown in FIG. 4. The system shown in FIG. 5 uses the first and second set of optical fibers 100 and 200 as shown in FIG. 4 and uses at least one additional set of optical fibers (cables) 300 arranged (on the mat 55 if used) to optically communicate with predetermined transmitters and receivers connecting the first and second sets of fibers. More particularly, the fibers of set 300 (300a–f) interconnect selected input ends of the first set 100 of fibers with selected output ends of fibers of the second set 200 of fibers. The fibers 300a–f are physically arranged to crisscross the active area of the seat and the fibers of the first and second sets. As a consequence of connecting the third set of fibers 300 as described, the individual fibers 300a–f set are placed at determinable orientations relative to the first 100 and second 200 sets of fibers. As can be seen, the set of cables 300a–f only covers the lower left-half side of the matrix of cables in FIG. 5.

More particularly, the new set of cables 300 is arranged, for example, with fiber optic cable 300a linking from the input end of cable 100a (a first fiber of the first set) to the output end of cable 200n (the last fiber of the second set 200). In the case of FIG. 5, which for the purpose of illustration includes six cables (fibers) in the first and second sets of fibers, optical fiber 300a extends between the input end of fiber 100a to the output end of fiber 200f. Similarly, cable 300b extends from the input end of the second optical fiber (100b) of the first set of optical fibers to the output end of the fifth optical fiber (200e) of the second set. Cables 300c–f are connected in a similar manner, as shown in FIG. 5. The optic fiber arrangement of FIG. 5 includes a fourth set 310 of fibers 310a–f, configured in a manner similar to that of the fibers 300a–f. The fibers 310a–f crisscross the upper right-half portion of the matrix of fibers. When connected the fibers 310a–f will be arranged parallel to the fibers of set 300 and crisscross the fibers in sets 100 and 200. More particularly, individual cables 310a–310f of set 310 extend respectively from the first-through-the-sixth (nth) input ends of fibers 200a–f and connect to the sixth-through-the-first output ends of the fibers 200a–f respectively. As can be appreciated the fibers are not physically connected to one another at their respective ends, which could be the case, but the fibers are connected using known types of optical splitters or Y-connectors 301a–f, 303a–f, 305a–f and 307a–f.

By utilizing the crisscrossing of the additional sets of optic fibers, the resolution of the active area of the matrix of optic cables is improved without increasing the number of optical receivers required.

For example, if the same object 120 is placed on the matrix of optical cables defined in FIG. 5, the cables 100*a* and *b*, as well as 200*a–c*, will show the presence of this object/occupant 120. In addition, fibers 300*a* and 310*a* and 310*b* are activated.

The operation of the system illustrated in FIG. 5 differs from that of the system shown in FIG. 4. Firstly, this system utilizes separate optical transmitters 60*a* and 60*b* (or discrete sets thereof), which are under the control of the microprocessor 500. The light sources comprising the optical transmitters 60*a* and 60*b* can be energized (by, for example, the control of the microprocessor 500) in sequence to avoid generating conflicting signals in receivers 62*a–f* and 162*a–f* that are connected to both light sources 60*a* and 60*b*. As mentioned, the input light signal is communicated to respective Y-type optical terminations (connector), which in turn are communicated to multiple fibers of sets 100 and 300, as well as to fibers of sets 200 and 310. With light source 60*a* energized (and source 60*b* shut down), the microprocessor 500 samples the state of each receiver 62*a–f* and 162*a–f* to determine which fiber output has changed and the magnitude of such change and stores the output values in memory locations within the microprocessor 500.

As can be seen, receivers 162*a–f* will provide information regarding the state of the fibers 300*a–f* with light source 60*a* energized. Thereafter, light source 60*a* is deactivated and light source 60*b* activated. The microprocessor 500 again interrogates the receivers 62*a–f* and 162*a–f*, and stores the output values which now also includes output signals through cables 200*a–f* and 310*a–f*. The information is combined with the first stored data to provide an indication of the pattern produced by the occupant/object 120. The above process is repeated with a duty cycle (or clock) of the microprocessor 500.

It should be appreciated, in a broad sense, the angularly disposed sets of fiber optic cables 300*a–f* and 301 a-*f* can be considered as subsets of a single set comprising all such fiber optic cables.

Figure 6:
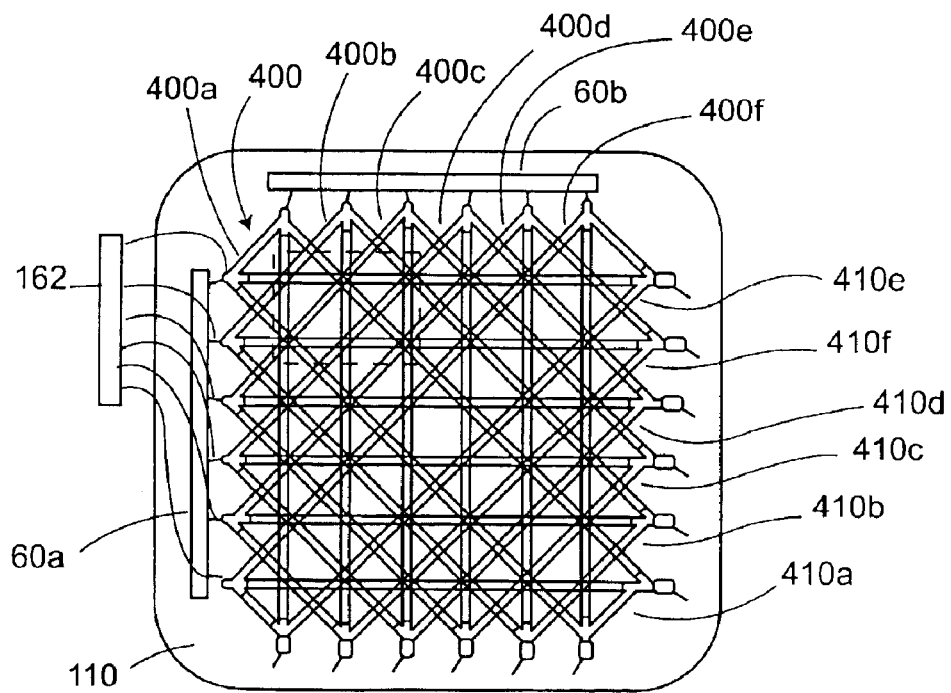
FIG. 6 is an additional embodiment of the present invention.

Another embodiment of the invention is shown in FIG. 6. An additional set of fibers 400 is laid between the input ends of each of the cables 100*a–f* and 200*a–f*. These cables or fibers are identified by numerals 400*a–f*. A further set 410 of optical cables 410*a–f* connects like numbered output ends of the respective cables 100*a–f* to 200*a–f*. As described above, the sets 400 and 410 can be considered to be subsets of a larger set of fibers. It should also be noted the input ends of the fiber optic cables 100*a*–100*f*, in addition to being terminated at individual light sources 61*a–f* or at the common light source 60, are also communicated at individual receivers to 162 with appropriate optical termination (connectors).

Figure 7:
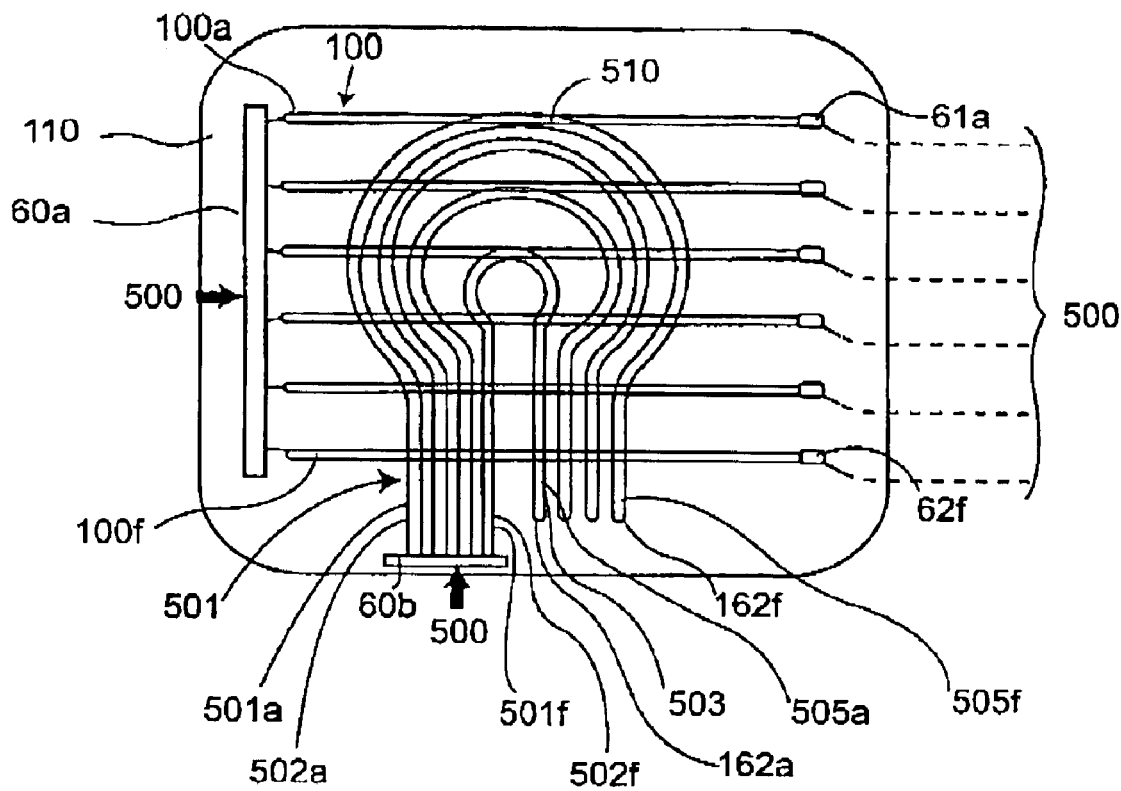
FIG. 7 illustrates an alternative embodiment of the invention utilizing a plurality of arcuately arranged optic fibers.

Reference is made to FIG. 7, which illustrates a further embodiment of the present invention. In this embodiment a first set of fibers 100 includes a plurality of parallel situated fibers 100*a*. Situated relative to set 100 is an additional set of optic cables 501 including individual fibers 501*a*–501*r*. As illustrated each of the fibers 501*a–f* is configured to have a circular center portion 510 and each fiber 501*a* to 501*f* is arranged concentrically one to the other.

Each of the fibers 501*a–f* includes the respective input end 502*a–f* connected into an optical termination (not shown) as well as an output end 505*a–f*, which is similarly appropriately terminated (the optical termination is also not shown). One or more optical sources 60*a* and 60*b* are connected to input ends of the fibers. Each output end of a fiber is also communicated to a respective receiver, such as 162*a–f*. Each of the light sources used in FIG. 7 can be communicated to the microprocessor 500, which controls their sequence of operation or alternately the light sources can be lit all of the time. Additionally, as before, each respective receiver 62*a–f* and 162*a–f* is communicated to the microprocessor 500.

Figure 8:
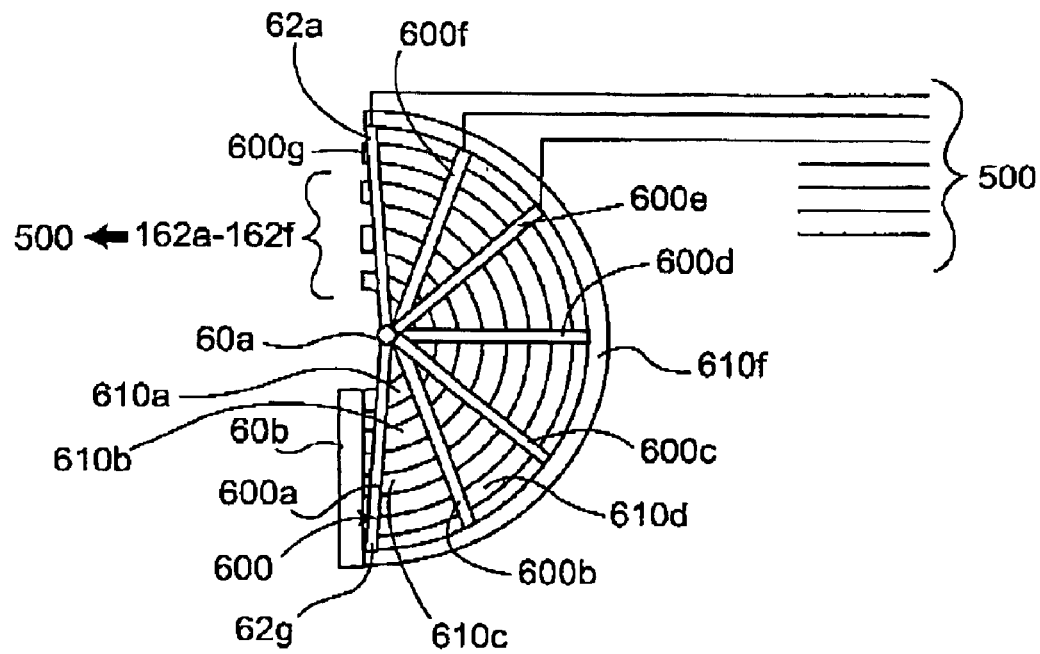
FIG. 8 illustrates another embodiment of the invention.

Reference is made to FIG. 8, which illustrates still another embodiment of the invention. Two sets of fiber optic cables 600 and 610 are configured into a polar coordinate system. More particularly, fibers 600*a–g* are aligned radially at predetermined polar angles (emanating from a common center or origin) while fibers 610*a–f* are arranged in concentric circles with predetermined spaces in between. The input ends of the radially oriented cables 600*a–g* can be communicated to one light source 60*a* (which can be located at the center of the coordinate system or remote therefrom and communicated thereto by optic fibers) with the output ends communicated to respective receivers 62*a–g*, which in turn are connected to microprocessor 500. The input ends of the circularly disposed cables 610*a–f* can be communicated to one light source 60*b* with the respective output ends communicated to respective receivers 162*a–f*, which in turn are connected to microprocessor 500. As with all of the embodiments the number of fibers in each set can be unlimited and the number of fibers in each set need not be equal. A change in the output of two intersecting fibers is used to locate the area or region of the input force acting on the seat; the magnitude of the change in the output signal is identifiable with the magnitude of the input force on the seat. From this information the measured pattern of data can be correlated with the known force patterns to identify the occupant or object on the seat.

Many changes and modifications in the above-described embodiment of the invention can, of course, be carried out without departing from the scope thereof. Accordingly, that scope is intended to be limited only by the scope of the appended claims.

What is claimed is:

1. An occupant classification system comprising:
    a seat upon which an occupant may sit or on which an object may be placed, the seat having one of a seat cushion and a seat back;
    a first set of optical fibers, the first set including individual fibers arranged parallel to one another, a second set of optical fibers arranged at a predetermined angle relative to the first set of optical fibers; each optical fiber having a measurable optical characteristic, the optical characteristics of the fibers changeable when a force is applied to a particular fiber;
    a third set of optical fibers, wherein a particular optical fiber of the third set of fibers extends from a transmitter associated with the first set of optical fibers to a receiver associated with the second set of optical fibers, and
    a processor responsive to an output signal from at least one optical fiber for generating a control signal determinative of a physical characteristic of an object or occupant on the seat.

2. The system as defined in claim 1 wherein each fiber of the second set of optical fibers includes a curved portion.

3. The system as defined in claim 1 wherein the third set of optical fibers can be subdivided into two generally equal subsets (300, 310).

4. The system as defined in claim 1 including a fourth set of optical fibers wherein a portion of the fibers of the fourth set of optical fibers connects a specified input end of certain fibers of the first set of fibers to the input end of certain fibers of the second set of fibers.

5. The system as defined in claim 4 wherein a portion of the fourth set of optical fibers connects a specified output end of certain fibers of the first set of fibers to the output end of certain fibers of the second set of fibers.

6. An occupant classification system comprising:
- a seat upon which an occupant may sit or on which an object may be placed, the seat having one of a seat cushion and a seat back;
- a first set of optical fibers, the first set including individual fibers arranged parallel to one another, a second set of optical fibers arranged at a predetermined angle relative to the first set of optical fibers; each optical fiber having a measurable optical characteristic, the optical characteristics of a fiber changeable when a force is applied to a particular fiber;
- a processor responsive to an output signal from at least one optical fiber for generating a control signal determinative of a physical characteristic of an object or occupant on the seat; and
- the first and second sets of fibers are configured into a Cartesian coordinate system.

7. An occupant classification system comprising:
- a seat upon which an occupant may sit or on which an object may be placed, the seat having one of a seat cushion and a seat back;
- a first set of optical fibers, a second set of optical fibers; wherein an optical characteristic of a fiber is changeable when a force is applied to the fiber;
- the first and second sets of fibers configured into a polar coordinate system; and
- a processor responsive to an output signal from at least one optical fiber for generating a control signal determinative of a physical characteristic of an object or occupant on the seat.

* * * * *